United States Patent [19]
Buongiorno

[11] Patent Number: 5,477,026
[45] Date of Patent: Dec. 19, 1995

[54] LASER/POWDERED METAL CLADDING NOZZLE

[75] Inventor: Angelo Buongiorno, Wanague, N.J.

[73] Assignee: Chromalloy Gas Turbine Corporation, Orangeburg, N.Y.

[21] Appl. No.: 189,117

[22] Filed: Jan. 27, 1994

[51] Int. Cl.$^6$ .................................................. B23K 26/14
[52] U.S. Cl. ................... 219/121.84; 219/121.64
[58] Field of Search .................... 219/121.65, 121.66, 219/121.84, 121.86, 121.63, 121.64; 427/596

[56] References Cited

U.S. PATENT DOCUMENTS

| | | | |
|---|---|---|---|
| 4,467,171 | 8/1984 | Ramos | 219/121.84 |
| 4,724,299 | 2/1988 | Hammeke | 219/121.65 |
| 4,782,496 | 11/1988 | Couturier | 219/121.84 |
| 5,043,548 | 8/1991 | Whitney et al. | 427/596 |
| 5,321,228 | 6/1994 | Krause et al. | 219/121.84 |
| 5,418,350 | 5/1995 | Freneaux et al. | 219/121.84 |

FOREIGN PATENT DOCUMENTS

| | | | |
|---|---|---|---|
| 3637568 | 5/1988 | Germany | 219/121.84 |
| 1-181991 | 7/1989 | Japan | 219/121.84 |
| 4-162974 | 6/1992 | Japan | 219/121.63 |
| 2227964 | 8/1990 | United Kingdom | 219/121.84 |
| 93-13871 | 7/1993 | WIPO . | |

*Primary Examiner*—Geoffrey S. Evans
*Attorney, Agent, or Firm*—Mitchell D. Bittman; Jerome M. Berliner

[57] ABSTRACT

Laser powered metal cladding apparatus that projects a laser beam to impinge upon a metal workpiece to form a shallow puddle of liquid metal is provided with a passage through which powered metal is delivered to the puddle. The apparatus includes a removable conical nozzle having a central opening through which the laser beam and powered metal exit the apparatus. The central opening extends to the front surface of the nozzle, which front surface is the smaller end of the nozzle and is in close proximity to the workpiece. A plurality of axial passages in the tapered wall of the nozzle extend rearward from the front surface and are arranged in an array that is centered around the central opening. A relatively high volume of inert gas flows through these axial passages to form a curtain that acts as an oxidation shield at the puddle of liquid metal, prevents powered metal from spreading sideways as it exits the central opening and drives sputtering particles back to the workpiece. This high volume of inert gas also serves to cool the nozzle thereby increasing the life thereof.

29 Claims, 10 Drawing Sheets

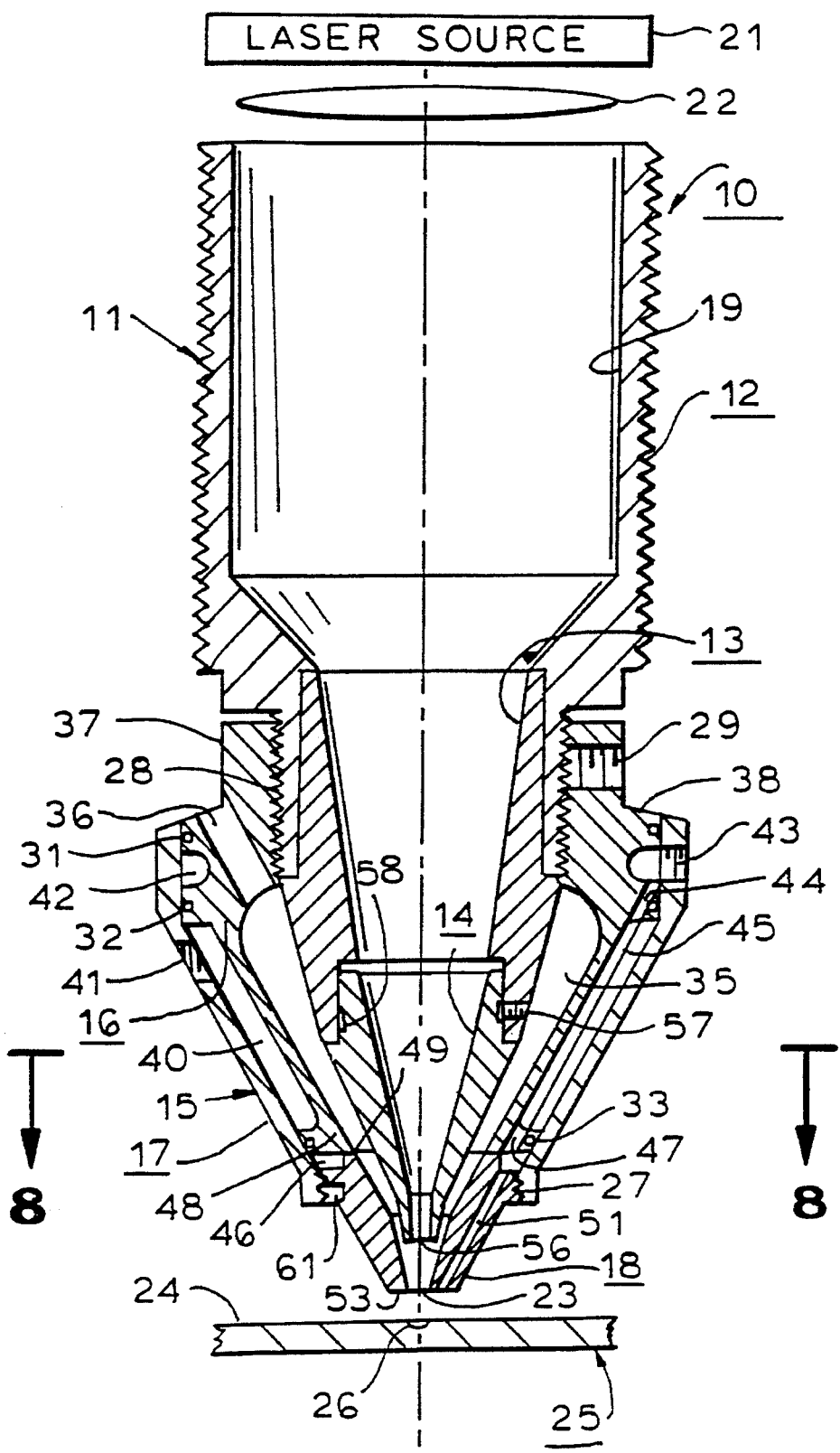

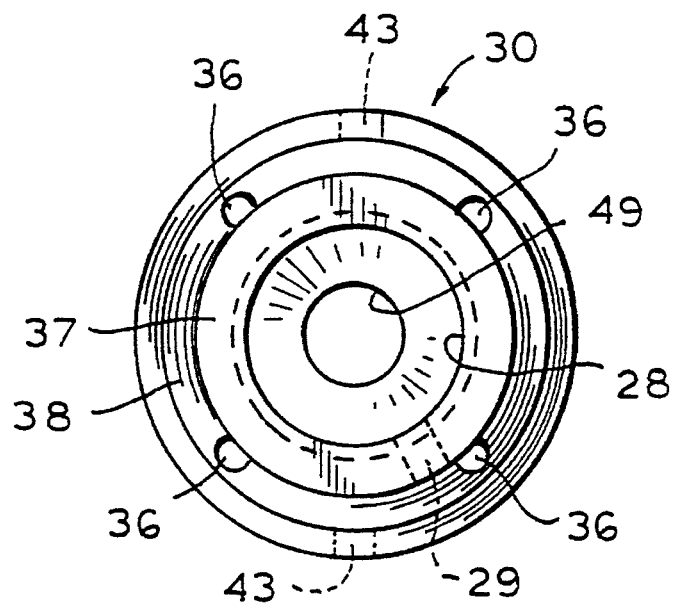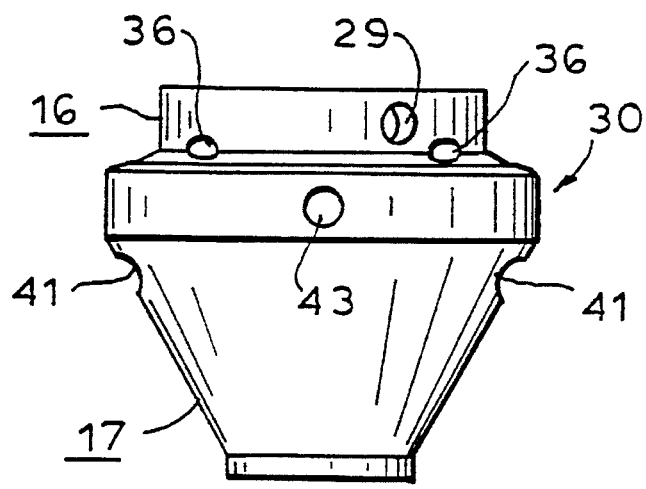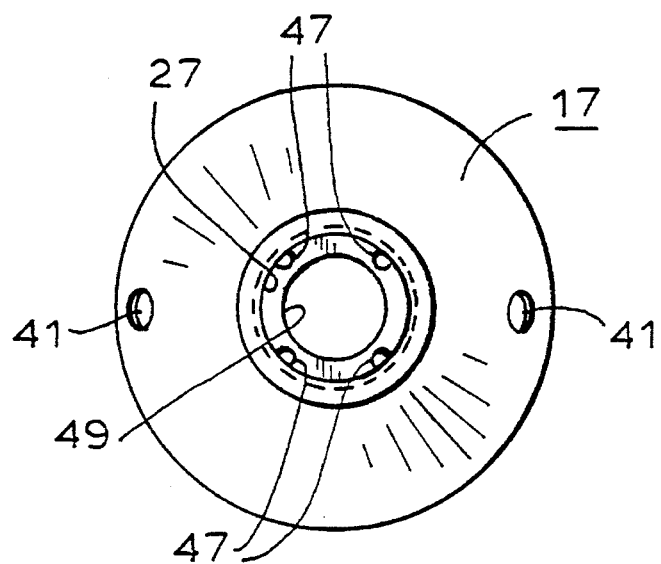

LASER/POWDERED METAL CLADDING NOZZLE

BACKGROUND OF THE INVENTION

This invention relates to a nozzle apparatus that utilizes laser energy and powdered metal for correcting surface defects in metal articles and, more particularly, relates to apparatus which is an improvement of that disclosed in U.S. Pat. No. 4,724,299 issued Feb. 9, 1988 to A. W. Hammeke for LASER SPRAYING NOZZLE AND METHOD.

The apparatus disclosed in U.S. Pat. No. 4,724,299 is a torch nozzle that sprays metal powder into a shallow puddle of molten metal formed on the surface of a workpiece by a laser beam. Normally, the laser beam is directed inside the torch, and is focused to contact the metal powder at or near the surface of the workpiece. The latter is positioned in close proximity to the outlet of the spray nozzle and because of this the nozzle is subjected to a high level of heat which radiates from the of workpiece region that is melted by the laser beam. This radiant energy heats the spray nozzle to such an extent that it must be replaced frequently, and it must also be serviced frequently because molten material that sputters from the surface of the workpiece tends to clog or partially block the nozzle outlet. Further, spray nozzles constructed according to the teachings of U.S. Pat. No. 4,724,299 tend to be unduly bulky thereby preventing utilization thereof for cladding in cramped work locations. In addition, while inert gas that flows with the powdered metal through the same outlet as the laser beam provides an oxidation seal, such seal is not sufficient to assure that the weld-like repairs which are produced will, on a consistent basis, be clean (i.e. free of oxidation and/or other contaminants).

The prior art, as depicted in FIG. 15 hereof, has attempted to avoid the above noted problems of weld oxidation and frequency of nozzle repair by providing a flow of inert cooling gas that is directed along the outside surface of the nozzle tip and toward the surface being repaired. More particularly, a laser beam produced by source 21 is directed downward through focusing lens 22, exit 256 at the front of longitudinal passage 219 for rear unit 211, and exit 223 at the front of front unit 215, being focused at upper surface 24 of workpiece 25 to create shallow puddle 26 of molten metal. At the same time, metal powder carried by an inert gas flows downward in conical passage 235 between the outside of rear unit 211 and the inside of front unit 215, and through exit 223 into puddle 26.

The front portion of nozzle apparatus 200 is subjected to very high temperatures radiated from surface 24. To cool apparatus 200 water or other cooling fluid is circulated in jacket 240 that is formed between inner and outer cups 216, 217 of front unit 215. Increased cooling and shielding is obtained by providing a substantial flow of inert gas directed into manifold 275 that is formed by annular jacket 219 which surrounds front unit 215 and is located a substantial distance behind work surface 24. This inert cooling gas exits manifold 275 through the screened lower surface 220 of jacket 219 that defines manifold 275, and flows along the outside of front unit 215 to impinge upon surface 24.

While the flow of inert gas from manifold 275 provides increased cooling and increases shielding of metal in puddle 26 from oxidation, the construction of jacket 219 creates problems of its own. That is, jacket 219 makes the tip of apparatus 200 too bulky to fit into confined areas. Further, the large horizontal area provided by screened surface 220 absorbs more radiant heat as compared to a steeply inclined surface that tends to reflect much of the radiant heat away from the source radiating same. Further, since exit screen 220 of jacket 219 is a substantial distance from exit 223 at the front of nozzle 218 inert cooling gas from manifold 275 has only a limited cooling effect on tip 218, has only a limited effect on preventing oxidation from occurring at the repair or weld site (puddle 26), and has only a limited effect in driving sputtering particles back to the puddle 26 of molten metal from whence they came.

SUMMARY OF THE INVENTION

In order to overcome the aforesaid problems which are characteristic of prior art constructions for spray nozzles that deliver metal powder to a shallow puddle of molten metal, the instant invention provides a construction having a nozzle with a relatively slim profile so that it may be utilized in cramped quarters. Included is a readily removable and replaceable conical tip that is constructed of copper and provided with passages through which inert gas flows to cool the tip and shield the weld area. That is, the exits for these passages are at the surface of the tip which also has the outlet opening through which the metal powder and the laser beam exit from the apparatus. This positions the exits for the cooling gas at the location that is closest to the heat radiating workpiece. These exits are arranged in a circular array that surrounds the outlet opening, and in this way the inert gas forms a curtain that surrounds the metal powder as it exits from the outlet opening to shield the weld area and to prevent the powder from scattering sideways. At the same time this inert gas drives sputtering metal away from the nozzle outlet opening and back to the puddle of molten metal that is created by the laser beam.

The accompanying drawings illustrate three embodiments of this invention. All three of these embodiments include a readily replaceable copper tip that is cooled by a relatively high volume of inert gas. In two of these embodiments (FIGS. 1–8A and FIGS. 9–13) portions of the apparatus are cooled by water or other fluid which flows through a water jacket which is internal to a substantial portion of the apparatus that is disposed to the rear of the removable tip. The inert gas for cooling the removable tip is supplied thereto through a plurality of tubes that extend through the water jacket. In one these two embodiments of the gas tubes extend between a relatively large annular manifold at the rear of the water jacket and a relatively small annular manifold at the front of the water jacket, with the gas passages being through the removable tip and extending forward from the small manifold. In this embodiment the gas passages are drilled axially between front and rear of the thin sidewall for the removable tip, being parallel to and between the surfaces of such sidewall. In the other of these water cooled embodiments the gas passages include axial slots in the outside surface of the thin sidewall, and the sides of these slots are closed by a conical retainer that removably secures the tip in its operating position.

In the third embodiment (FIG. 14) liquid is not utilized for cooling. Here inert gas is utilized to cool the removable tip as well as to cool other portions of the apparatus that are positioned to the rear of the tip. Such other portions are provided with a frusto conical gas jacket through which cooling gas flows from its large base to its small base before entering the gas passages in the removable tip.

Accordingly, a primary object of the instant invention is to provide improved laser powered nozzle apparatus that utilizes powdered metal for cladding selected areas of a metal workpiece.

Another object is to provide apparatus of this type that may be utilized in cramped quarters.

Still another object is to provide apparatus of this type that is shaped to limit heating of the nozzle and is provided with effective means for cooling same.

Yet another object is to provide apparatus of this type which provides an effective shield of inert gas over the weld area.

A further object is to provide apparatus of this type that includes a relatively inexpensive tip that is readily removable and replaceable.

A still further object is to provide apparatus of this type that is constructed so that inert gas is utilized to confine metal powder that exits from the apparatus through its outlet opening and also serves to force sputtering molten metal back toward the workpiece.

BRIEF DESCRIPTION OF THE DRAWINGS

These objects as well as other objects of this invention shall become readily apparent after reading the following description of the accompanying drawings in which:

FIG. 1 is an axial or longitudinal cross-section for a first embodiment of laser powered metal cladding apparatus constructed in accordance with teachings of the instant invention with a portion of the apparatus being cooled by the inert shielding gas and another portion being fluid cooled, such cross-section being taken along line 1—1 of FIG. 7 looking in the direction of arrows 1—1.

FIG. 5 is a side elevation of the front unit with its nozzle tip removed.

FIG. 6 is a front or bottom view of the front unit elements of FIG. 5.

FIG. 7 is a rear or top view of the front unit elements of FIG. 5.

DETAILED DESCRIPTION OF THE INVENTION

Figure 4:
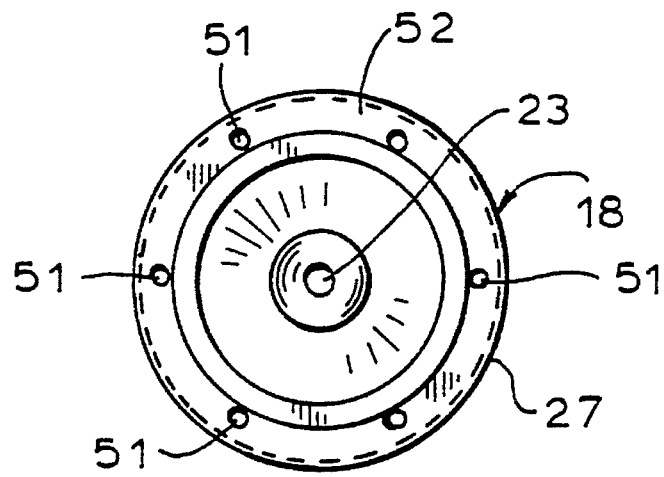
FIG. 4 is a rear or top view of the removable nozzle tip illustrated in FIG. 2.
Figure 2:
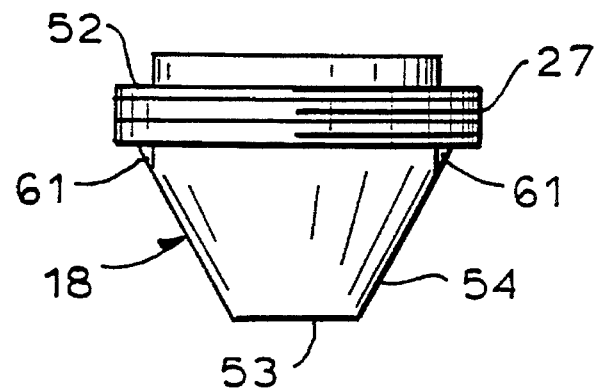
FIG. 2 is an enlarged side elevation of the removable nozzle tip for the front unit of the apparatus illustrated in FIG. 1.

Now referring to the drawings and more particularly to FIGS. 1 through 8 wherein cooling of laser powered metal cladding apparatus, indicated generally by reference numeral 10, is accomplished by both inert shielding gas and another fluid, generally water or other appropriate liquid or gas. Apparatus 10 includes rear or upper unit 11 consisting of three elements 12–14 and front or bottom unit 15 that consists of three other elements 16–18. All of the elements 12–14 and 16–18 are generally circular in transverse cross-section.

Element 12 is a tube at the rear of unit 11, element 14 is a conical tip at the front of unit 11 and element 13 is a transition member that is interposed between elements 12 and 14. Elements 12 and 13 are connected by a force fit therebetween, and a screw (not shown) extends through transverse threaded aperture 57 in element 13 and enters annular groove 58 in element 14 to connect element 14 to element 13. Elements 12–14 are in axial alignment and are hollow so as to cooperate in forming longitudinally extending beam passage 19 for a laser beam emitted by source 21. Such beam passes through adjustable (repositionable) lens 22 at the rear of unit 11, passes through opening 56 at the narrow end of conical tip 14 and exits through outlet opening 23 at the front of unit 15 to impinge on upper surface 24 of workpiece 25 that is disposed in front of and in close proximity to exit opening 23. In a manner known to the art, during welding or cladding, this laser beam heats a localized portion of surface 24 to form a shallow puddle 26 of molten metal. The shape of such puddle 26 is determined by apparatus (not shown) that mounts workpiece 25 and moves same horizontally in a controlled manner relative to cladding apparatus 10 while the latter remains stationary.

Element 16 is an inner conical cup that is disposed within outer conical cup 17 and is fixedly connected thereto, by a brazing operation that employs solder rings (not shown) in annular grooves 31–33 of inner cup 16. The combination of cups 16 and 17 forms cup assembly or body 30 (FIGS. 5–7). Element 18 (FIGS. 2–4) is a conical tip that is constructed of copper and is removably secured to the front of outer cup 17 by threads 27. The front portion (elements 13, 14) of rear unit 11 extends into front unit 15 through the open rear thereof, with cooperating threads 28 on the inside of a rear sidewall portion of inner cup 16 and on the outside of a front sidewall portion of element 12 operatively securing units 11 and 15 together for axial adjustment to establish the gap or spacing between the outer surface of element 14 and the inner surface of nozzle 18. A set screw (not shown) in threaded transverse aperture 29 through rear annular lip 37 of inner cup 16 locks units 11 and 15 against relative rotation.

An inner surface portion of forward unit 15 and a confronting outer surface portion at the forward portion of rear unit 11 are spaced slightly from each other and cooperate to form an annular conical passage 35 through which metal powder for cladding is delivered to outlet opening 23. Such metal powder enters passage 35 through four apertures 36 in inner cup 16 that are equally spaced in a circular array located at the intersection of lip 37 and shoulder 38 at the rear of inner cup 16. The confronting inner and outer surfaces of the respective cups 17 and 16 cooperate to form annular conical fluid (e.g. water) jacket 40 which is accessible through two apertures 41 that extend transversely through outer cup 17.

Figure 8:
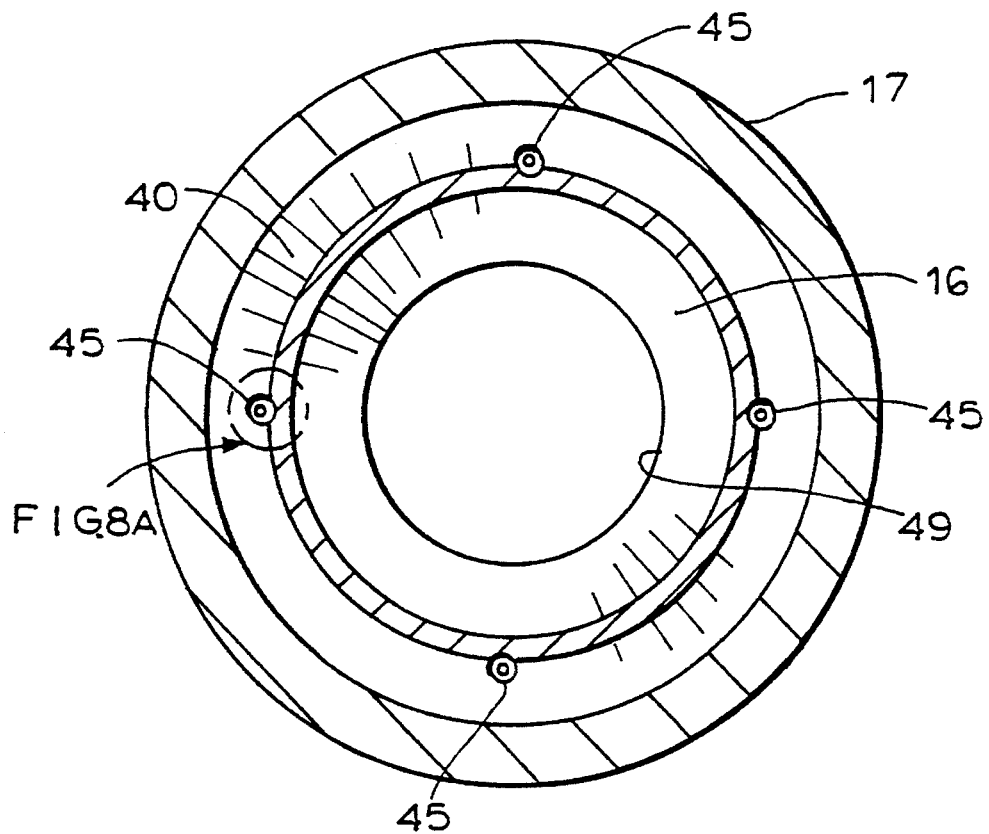
FIG. 8 is an enlarged transverse cross-section of the front unit with its nozzle tip removed, taken through lines 8—8 of FIG. 1 looking in the direction of arrows 8—8.
Figure 8A:
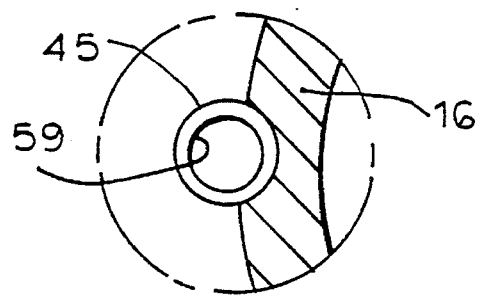
FIG. 8A is an enlargement of the encircled portion 8A in FIG. 8.
Figure 9:
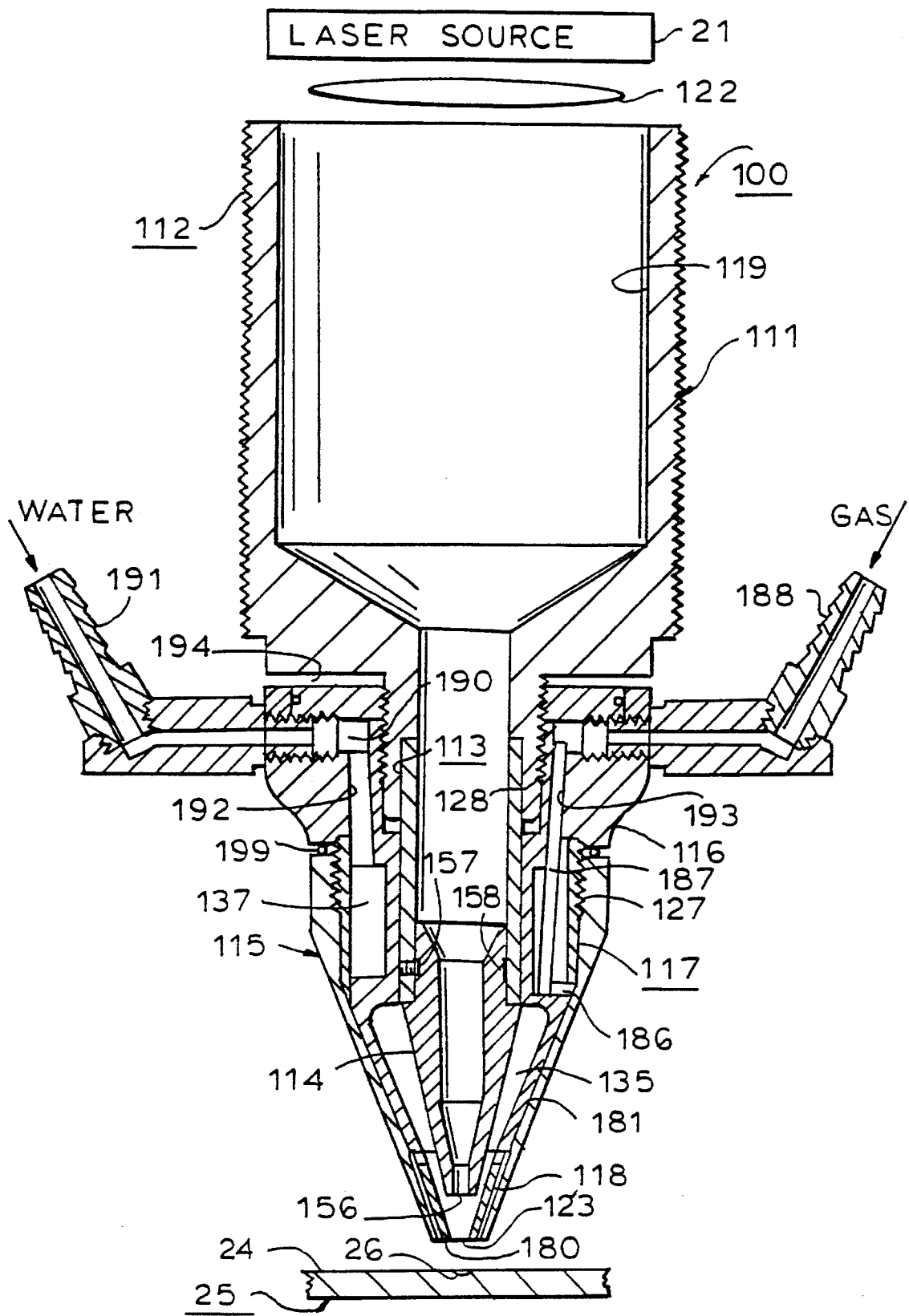
FIG. 9 is a longitudinal cross-section for a particularly slim second embodiment of this invention, which embodiment utilizes a cooling fluid, with such cross-section being taken along line 9—9 of FIG. 11 looking in the direction of arrows 9—9.
Figure 10:
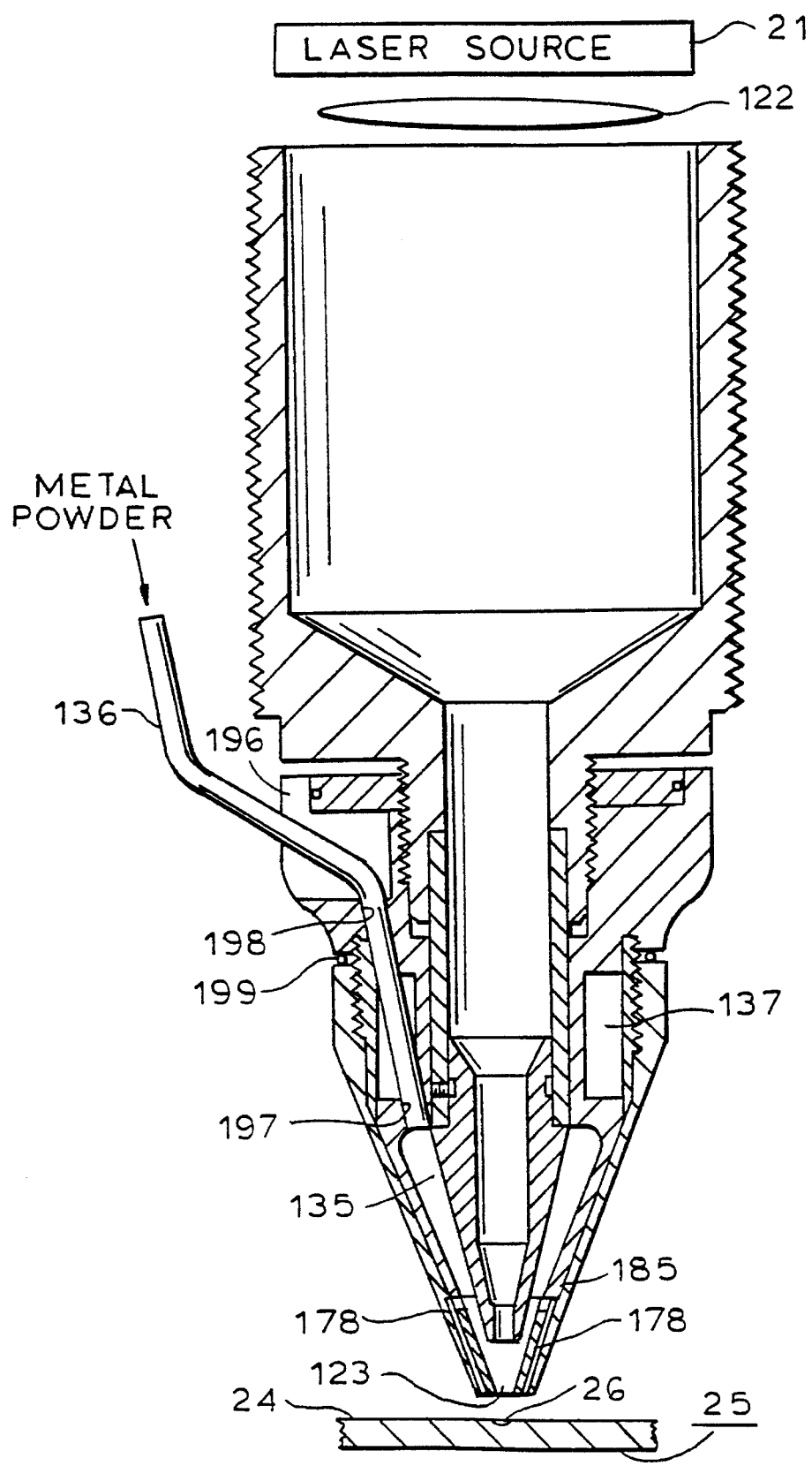
FIG. 10 is a longitudinal cross-section of the second embodiment taken through line 10—10 of FIG. 11 looking in the direction of arrows 10—10.
Figure 11:
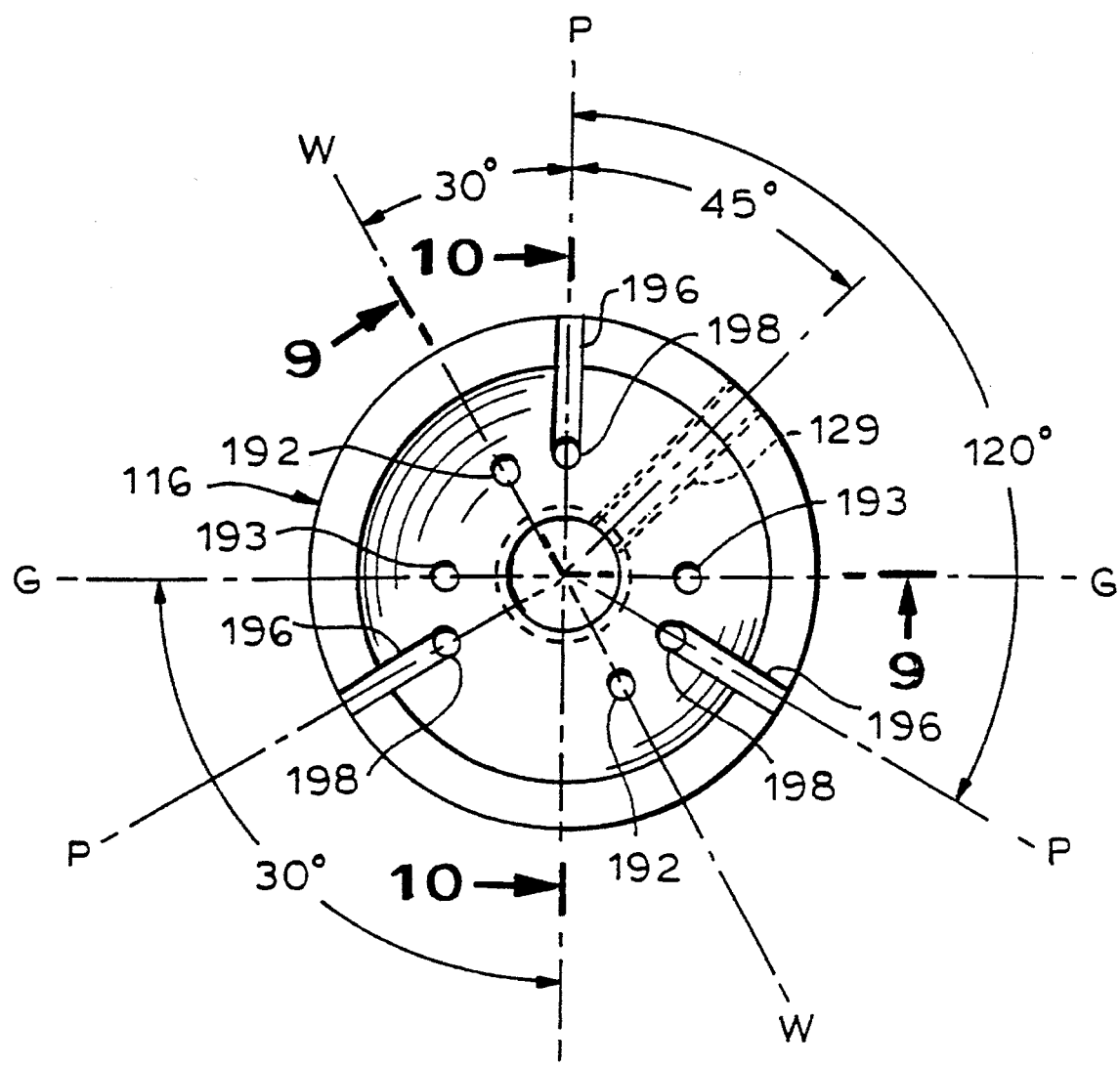
FIG. 11 is a front elevation of the body for the second embodiment before its disk cover is assembled therewith.

At the rear of fluid (water) jacket 40 is a relatively large manifold 42 formed by an annular groove in the outer surface of inner cup 16 which is, for the most part, closed by outer cup 17. Large manifold 42 is provided with gas entrances provided by two apertures 43 that extend through the side of outer cup 17 and are diametrically opposed. Along its front boundary, manifold 42 is provided with four equally spaced exits 44. An individual thin walled tube 45 extends forward from each aperture 44 to relatively small manifold 46 that is formed through the cooperation of cups 16 and 17 and removable tip 18. There are four apertures 47 that extend through annular lip 48 at the forward end of inner cup 16 and constitute entrances to small manifold 46. Each tube 45 extends between an exit 44 from large manifold 42 for an entrance 47 to small manifold 46 and is soldered in place so that neither of the manifolds 42 and 46 communicates with water jacket 40. In order to minimize the portion of water jacket 40 that is occupied by the four tubes 45, a sidewall portion of each tube 45 lies lengthwise in an individual shallow groove 59 (FIG. 8A) in the outer wall of inner cup 16.

Figure 3:
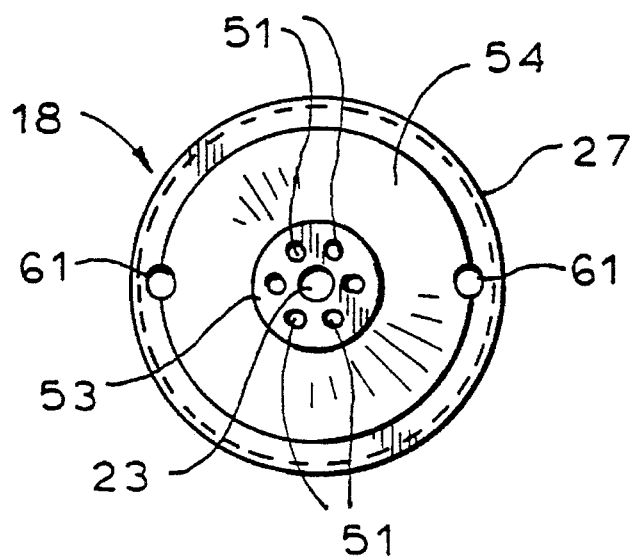
FIG. 3 is a front or bottom view of the removable nozzle tip illustrated in FIG. 2.

Small manifold 46 is provided with six exits in the form of passages 51 that extend generally parallel to the conical outer surface 54 of tip 18, between rear ledge 52 to front surface 53 thereof. As seen in FIG. 3, at surface 53 the front or exit ends of passages 51 are arranged in a circular array surrounding opening 23 through which metal cladding powder exits passage 35 and the laser beam from source 21 passes from the narrow front opening 56 of passage 19 to the outside of apparatus 10 to impinge upon surface 24 of workpiece 25.

Water or other suitable cooling fluid is circulated through water jacket 40 between apertures 41, one of which acts as an entrance and the other of which acts as an exit. Powdered metal for cladding is delivered to conical passage 35 at all four of its inlets 36, and exits through opening 23. Inert shielding gas for shielding the weld area and cooling removable tip 18 is supplied to large manifold 42 through all four of its entrances 43 and flows through the four tubes 45 through their front ends 47 to small manifold 46. Inert gas flows from small manifold 46 to front surface 53 of tip 18 through its six passages 51 in sufficient quantity to effectively shield the weld area and cool tip 18, thereby increasing its working life. Two diametrically opposed notches 61 are provided in the outer surface of tip 18 to receive a wrench (not shown) for loosening and tightening tip 18 to remove and replace same.

The shielding and cooling inert gas exiting through passages 51 shields the weld area by forming a conical curtain which restricts powdered metal from scattering sideways as it shoots through exit opening 23 and bombards puddle 26. Further, this curtain of gas urges sputtering metal back toward puddle 26 so that it does not build up on tip 18 or other elements of apparatus 10 and interfere with the flow of cladding metal powder from passage 35.

Figure 15:
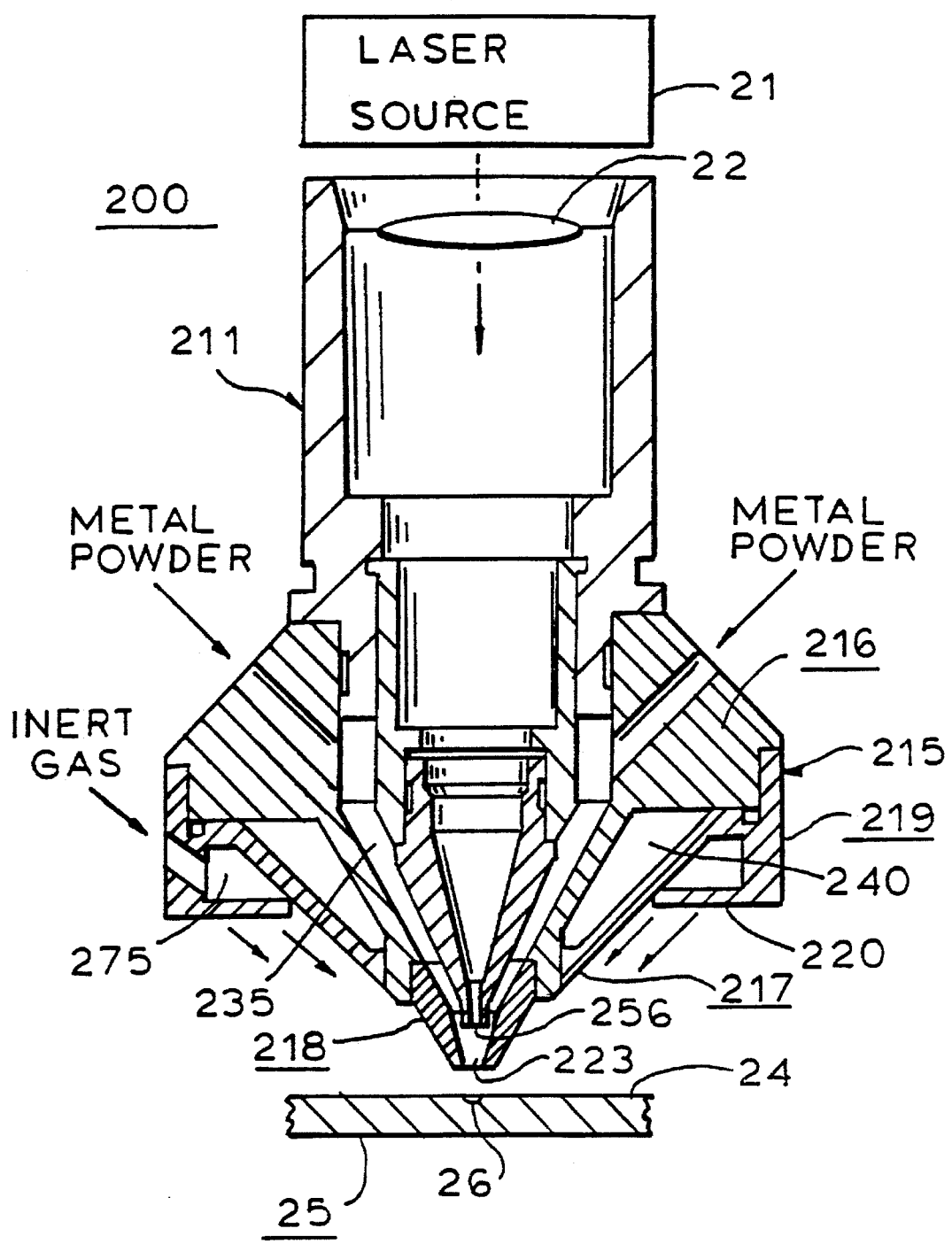
FIG. 15 is a longitudinal cross-section of a prior art construction for laser powered metal cladding apparatus in which inert shielding gas is introduced through a gas distributor that is outside of and surrounds the apparatus to the rear of the exit for the laser beam and metal particles that are used for welding.

It is noted that the shielding and cooling effects of the inert gas in passages 51 is much greater than the shielding and cooling effects of that inert gas which acts as a carrier for the cladding metal powder in passage 35 and the inert gas that flows through passage 19. That is, relatively low volumes of the inert gases are fed through passages 19 and 35 while relatively high volume of inert gas is fed through passages 51. Thus, we find that the inert cooling gas is supplied in relatively large quantities to the very region of tip 18 that is closest to the weld area (puddle 26) which is the source of energy that radiates from workpiece 25, thereby providing shielding and cooling where it is needed most. Radiant heating of bottom unit 15 is also reduced because the outer surface thereof is relatively steep and horizontal surfaces that confront the workpiece are of reduced area, especially as compared with large diameter jacket 54 in the apparatus of the aforesaid U.S. Pat. No. 4,724,299 or the gas distributor 119 shown in FIG. 15.

It should be apparent to those skilled in the art that suitable fittings (not shown) are used to provide connections (1) for inert gas to be fed into large manifold 42 at two apertures 43, (2) for metal powder to be fed into annular conical passage 35 through four apertures 36, and (3) for cooling fluid to be fed into and out of water jacket 40 through two apertures 41.

Now referring to FIGS. 9–13 wherein a second embodiment of the instant invention is illustrated. The principal distinguishing features between the first and second embodiments is that the latter is made particularly slim by increasing the focal length of laser focusing lens 122. Typically, this focal length for the second embodiment is in the order of 7.5 inches while the typical focal length for the first embodiment is in the order of 4.5 to 7.5 inches. Further, the removable nozzle tip is a two piece construction for the second embodiment as compared to the one piece construction of the first embodiment. As will hereinafter be seen, this two piece construction greatly simplifies forming the inert gas passages that extend axially to the front of the nozzle. In addition, in the second embodiment, construction of the body is simplified by utilizing a short tubular member and a single cup as compared with the double cup arrangement of the first embodiment.

More particularly, in the embodiment of FIGS. 9–13 laser powered metal cladding apparatus, indicated generally by reference numeral 100, includes rear unit 111 consisting of three elements 112–114 and front unit 115 that consists of four other elements 116–119. All of the elements 112–114 and 116–119 are generally circular in transverse (horizontal) cross-section.

Element 112 is a tube at the rear of unit 111, element 114 is a conical tip at the front of unit 111 and element 113 is a transition member interposed between elements 112 and 114. Elements 112 and 113 are connected by a force fit therebetween, and a screw (not shown) extends through transverse threaded aperture 157 in element 113 and enters annular groove 158 on the outside of element 114 to connect element 114 to element 113. Elements 112–114 are in axial alignment and are hollow so as to cooperate in forming longitudinally extending beam passage 119 for a laser beam emitted by source 21. Such beam passes through adjusting lens 122 at the rear of unit 111, passes through opening 156 at the narrow front end of conical tip 114 and exits through outlet opening 123 at the front of unit 115 to impinge on upper surface 24 of workpiece 25 disposed in front of and in close proximity to exit opening 123.

Element 116 is an inner conical cup, the central portion of which is closely fitted within short tube 117 and is fixedly connected thereto, preferably by a brazing operation, to form cup assembly or body 130. Element 118 (FIGS. 12 and 13) is a conical tip or nozzle that is constructed of copper and is removably mounted at the front of cup 116, being retained in operative position by outer conical retainer 119. The latter is removably secured to the outside of tube 117 by threads 127. For a reason which shall become apparent, 0-ring gasket 199 is squeezed between the rear annular edge of retainer 119 and a forwardly Racing outer ledge of cup 116.

The front portion (elements 113, 114) of rear unit 111 extends into front unit 115 through the open rear thereof, with cooperating threads 128 on the inside of a rear sidewall portion of cup 116 and on the outside of a front sidewall portion of element 112 operatively securing units 111 and 115 together for axial adjustment to establish the gap or spacing between the conical outer surface of element 114 and the inner conical surface of nozzle 118. A set screw (not shown) in threaded transverse aperture 129 (FIG. 11) in cup 116 locks units 111 and 115 against relative rotation.

An inner surface portion of forward unit 115 and a confronting outer surface portion at the forward portion of rear unit 111 are spaced from each other and cooperate to form an annular conical passage 35 through which metal powder for cladding is delivered to outlet opening 23. Such metal powder is delivered to passage 135 by three dog-leg tubes 136 that extend through annular water jacket 137. Apertures 197, 198 at the front and rear of water jacket 137 position tubes 136, which are also positioned by slim radial notches 196 (FIGS. 10 and 11) at the rear of cup element 116. Cover disk 194 is brazed in place at the rear of element 116 after notches 196 and apertures 197, 198 as well as passages 192 and 193 are formed.

There are two passages 192 and two passages 193, all extending generally axially and rearward from water jacket 137. The rear end of each passage 192 intersects an individual radial passage 190 having a fitting 191 at its outboard end. Cooling water flows into jacket 137 through one fitting 191 and out of jacket 137 through the other fitting 191.

The rear end of each passage 193 intersects an individual radial passage 189 having a fitting 188 at its outboard end through which cooling inert gas is introduced to front section 115. Extending forward through each passage 193 is an individual tube 187 that extends through jacket 137 and into manifold 186. The latter is an annular depression in the outer surface of cup element 116 and is positioned slightly forward of jacket 137. Inert gas is fed through both fittings 188 to manifold 186.

Figure 12:
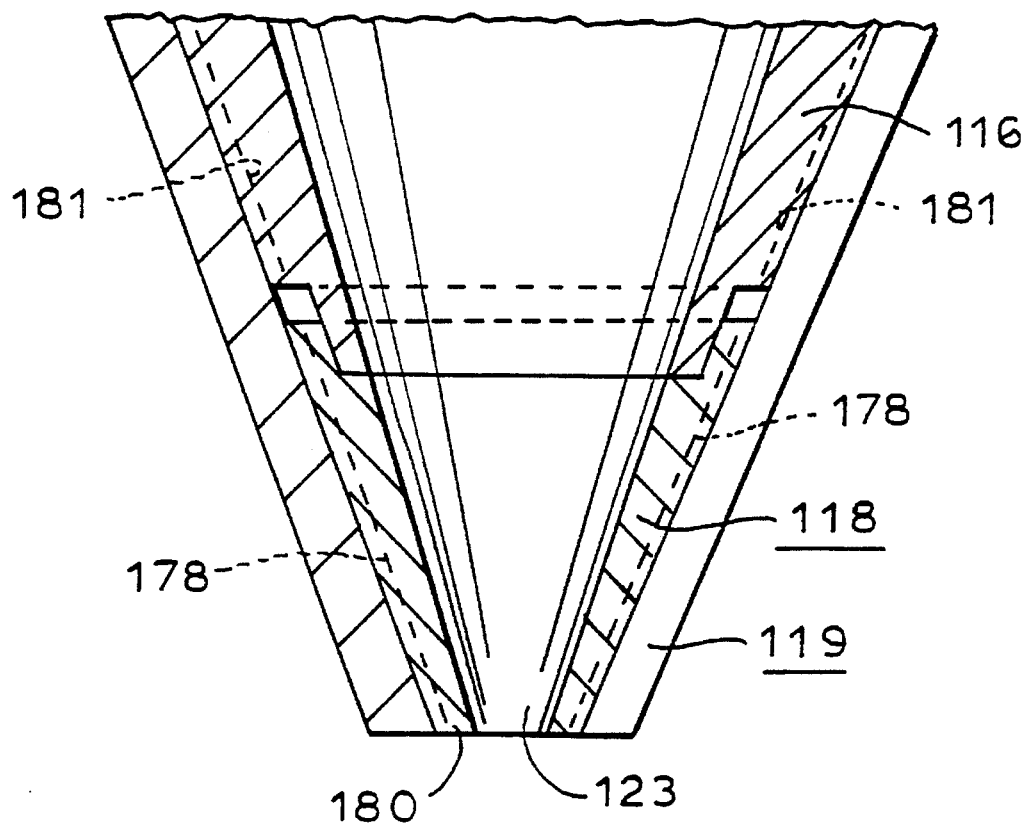
FIG. 12 is an enlarged axial cross-section of the removable nozzle tip together with a fragmentary portion at the front of the body.
Figure 13:
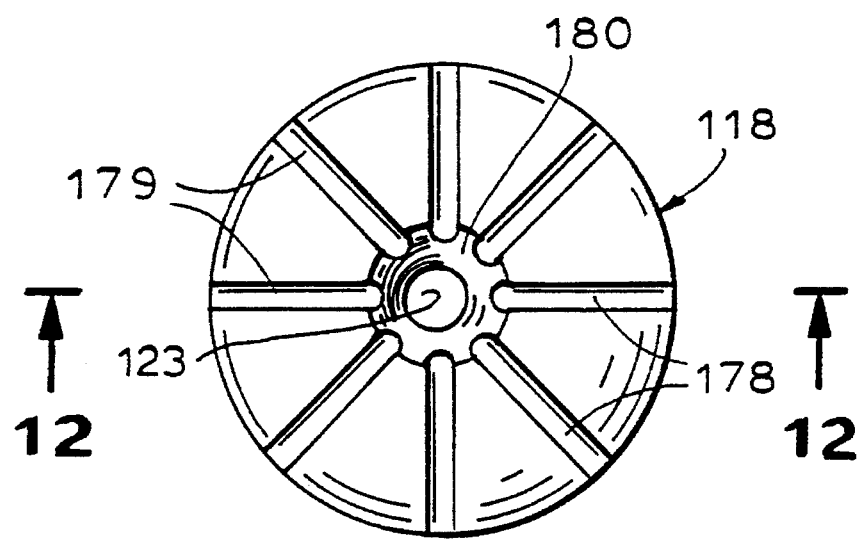
FIG. 13 is a front elevation of the nozzle tip in FIG. 12.

As seen best in FIG. 12, the rear edge of nozzle 118 is formed with an annular inside depression, and the front edge of element 116 is formed with an annular outside depression so that an outside annular manifold 185 is formed in element 116 along the rear edge of nozzle 118 where the latter engages the front edge of element 116. For the most part, the outer conical surface of nozzle 118 appears as a continuation of the outer conical surface at the forward portion of element 116. Both nozzle 116 and this forward portion of element 116 are disposed within retainer 119 to abut the conical inner surface thereof. Two axial slots 181 in the conical outer surface portion of cup element 116 constitute passages that interconnect manifolds 185 and 186.

Eight narrow axial slots 178 disposed with equal angular spaces therebetween extend the full length of nozzle 118 to constitute gas passages that extend between manifold 185 and front surface 180 of nozzle 118. The forward or exit ends of passages 178 form a circular array surrounding central outlet 123 through which a laser beam from source 21 and powdered metal flowing through conical passage 135 exit apparatus 100 to impinge upon surface 24 of workpiece 25. The arrangement of passages 178 creates a curtain of inert gas that prevent oxidation and maintains the front of nozzle 118, 119 clean.

Although not described herein, it should be apparent to those skilled in the art that where required, brazing and/or other fastening means are employed to maintain elements of the second embodiment in their operative positions.

Figure 14:
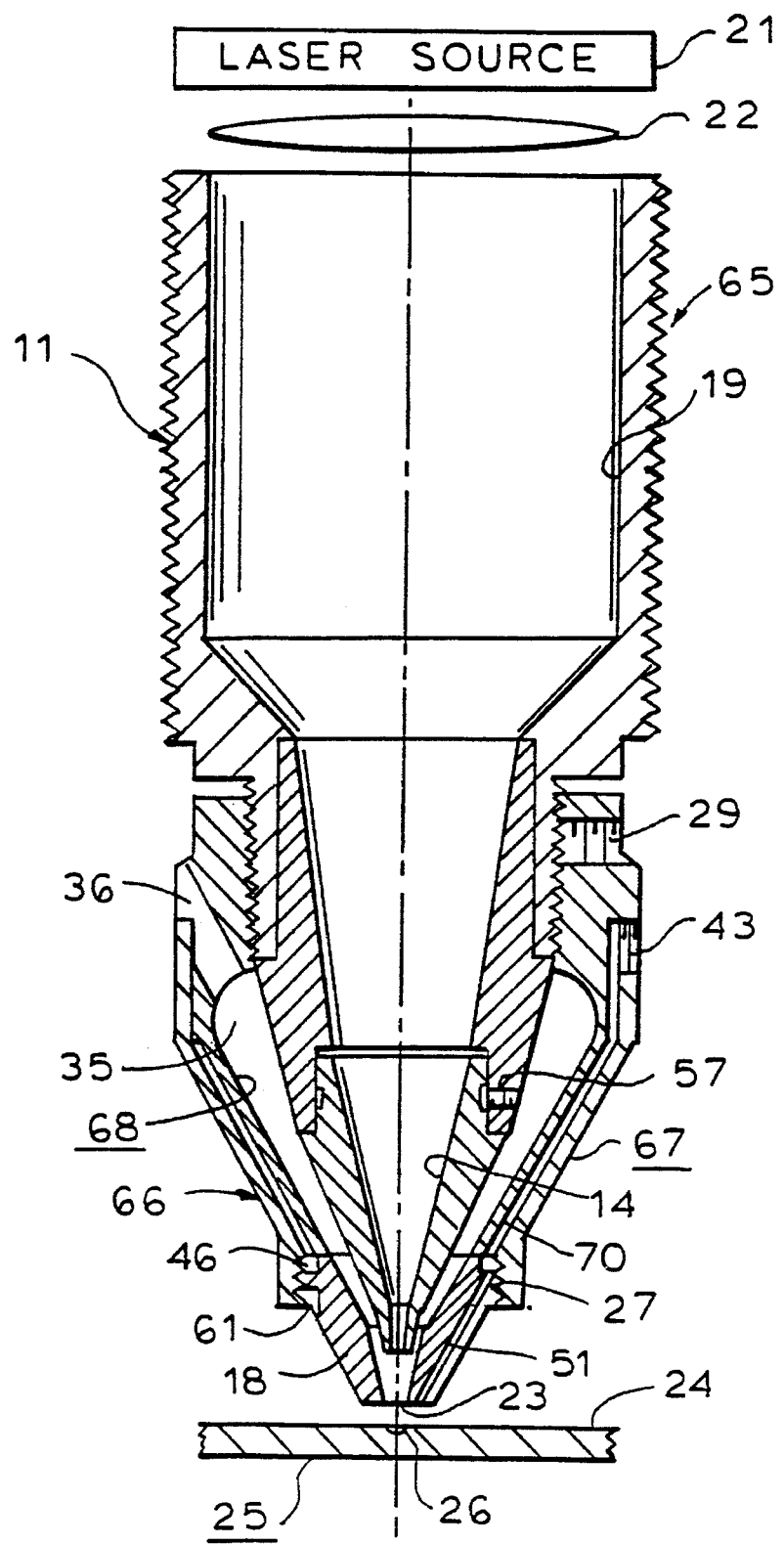
FIG. 14 is a longitudinal cross-section similar to that of FIG. 1 illustrating a third embodiment of this invention, which embodiment is cooled by inert shielding gas exclusively.

Now referring to FIG. 14 which illustrates a third embodiment of the instant invention in which laser powered metal cladding apparatus 65 is cooled by the inert shielding gas alone without using a fluid cooling jacket. Elements common to both the first (FIGS. 1–8A) and third (FIG. 14) embodiments are designated by the same reference numerals and descriptions thereof are not repeated when describing apparatus 65. The basic difference between apparatus 10 of FIG. 1 and apparatus 65 of FIG. 14 is that front or lower unit 66 of apparatus 65 replaces front unit 15 of apparatus 10.

Front unit 66 includes outer cup 67, inner cup 68 which extend into outer cup 67 through its large open rear end, and removable and replaceable front tip 18 at the small front end of cups 67, 68. Both cups 67 and 68 are conical and are fixedly secured to each other, as by brazing. Confronting side surface portions of cups 67, 68 are spaced apart to form a thin conical jacket 70 through which a high volume of inert gas is fed to annular manifold 46 that communicates with the rear ends of passages 51 through tip 18. Diametrically opposed apertures 43 through the side of outer cup 67 near its rear provide two inlets through which inert gas is fed to jacket 70 to cool cup assembly 67, 68. This inert gas also flows through six passages 51 to cool tip 18, and exits at front surface 53 of tip 18 to function as an oxidation and splattering shield as in the embodiment of FIGS. 1–8A.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Laser powered metal cladding apparatus including a front unit and a rear unit extending into said front unit through its open rear;

said rear unit having a beam passage extending from front to rear thereof, and said front unit having a front opening aligned with said beam passage whereby a laser beam projected forward through said beam passage is directed to exit said apparatus through said front opening and impinge upon a metal workpiece to heat and thereby liquify a localized surface portion thereof and to form a shallow puddle of liquified metal;

said apparatus also including an annular passage connectible to a supply of metallic cladding powder, said annular passage being operatively positioned and shaped to direct metallic powder moving forward therethrough to exit through said front opening and enter said shallow puddle;

said front unit including a nozzle at its forward end, said nozzle including a front end and a conical sidewall that tapers outward and rearward from said front end, and said front opening being at said front end;

a plurality of narrow generally axially extending gas passages in said conical sidewall, each of said gas passages having an exit end at said front end, said exit ends arranged in an array surrounding said front opening;

said gas passages extending rearward from said front end for operative connection to a source of inert gas that will flow forward through said gas passages in sufficient quantity to effectively cool said nozzle; and said front opening being constituted by a single aperture disposed at said forward end of said nozzle.

2. Laser powered metal cladding apparatus as set forth in claim 1 in which said exit ends are operatively positioned to direct gas exiting therefrom to provide an annular curtain that shield liquified metal in said puddle from being oxidized and inhibits said powder from dispersing radially as it exits said front opening.

3. Laser powered metal cladding apparatus as set forth in claim 1 in which the front unit includes a fluid jacket disposed behind said nozzle and being connectible to a supply of fluid and means to circulate said fluid through said fluid jacket to cool said apparatus; and at least one gas conduit that extends through said fluid jacket and connects said was passages to said source of inert gas.

4. Laser powered metal cladding apparatus as set forth in claim 3 in which water is the fluid that is circulated through said fluid jacket.

5. Laser powered metal cladding apparatus as set forth in claim 3 in which the front unit also includes a body disposed behind said nozzle and including an outer cup and an inner cup extending into said outer cup;

said inner cup having an annular outer wall and said outer cup having an annular inner wall confronting said outer wall in spaced relationship with respect thereto whereby said inner and outer walls cooperate to define said water jacket.

6. Laser powered metal cladding apparatus as set forth in claim 3 in which the fluid jacket surrounds the annular passage that directs forward movement of said metallic powder.

7. Laser powered metal cladding apparatus as set forth in claim 3 in which said front unit also includes a body disposed behind said nozzle;

said body including an inner cup and an outer tubular member surrounding a portion of said inner cup;

said inner cup having an annular outer wall at said portion and said tubular member having an annular inner wall confronting said outer wall in spaced relationship with respect thereto whereby said inner and outer walls cooperate to constitute boundary portions defining said fluid jacket.

8. Laser powered metal cladding apparatus as set forth in claim 7 in which said conical sidewall includes an exterior conical surface having a plurality of grooves constituting said gas passages;

said front unit also including a retainer that maintains said nozzle in its operative position disposed within said retainer, said retainer including an interior conical surface against which said exterior conical surface abuts; and thread means removably securing said retainer to said body.

9. Laser powered metal cladding apparatus as set forth in claim 8 in which a portion of said thread means is formed on an outer wall of said tubular member.

10. Laser powered metal cladding apparatus as set forth in claim 8 also including a ring gasket squeezed between a rear facing annular edge of said retainer and a forward facing surface of said inner cup to block said inert gas from exiting said apparatus at points behind said front end.

11. Laser powered metal cladding apparatus as set forth in claim 1 also including lens means through which said laser beam passes, said lens means being at the rear of said front unit and having a focal length of approximately 7.5 inches.

12. Laser powered metal cladding apparatus as set forth in claim 1 also including lens means through which said laser beam passes, said lens means being at the rear of said front unit and having a focal length that is within a range of between approximately 4.5 inches and 7.5 inches.

13. Laser powered metal cladding apparatus as set forth in claim 1 in which said nozzle is a one piece removable and replaceable unit.

14. Laser powered metal cladding apparatus as set forth in claim 1 in which the axially extending gas passages are generally parallel to both inner and outer conical surfaces on opposite sides of said conical sidewall.

15. Laser powered metal cladding apparatus as set forth in claim 1 in which the fluid jacket surrounds the annular passage that directs forward movement of said metallic powder.

16. Laser powered metal cladding apparatus including a front unit and a rear unit extending into said front unit through its open rear;

said rear unit having a beam passage extending from front to rear thereof, and said front unit having a front opening aligned with said beam passage whereby a laser beam projected forward through said beam passage is directed to exit said apparatus through said front opening and impinge upon a metal workpiece to heat and thereby liquify a localized surface portion thereof and to form a shallow puddle of liquified metal;

said apparatus also including an annular passage connectible to a supply of metallic cladding powder, said annular passage being operatively positioned and shaped to direct metallic powder moving forward therethrough to exit through said front opening and enter said shallow puddle;

said front unit including a nozzle at its forward end, said nozzle including a front end and a conical sidewall that tapers outward and rearward from said front end, and said front opening being at said front end;

a plurality of narrow generally axially extending gas passages in said conical sidewall, each of said gas passages having an exit end at said front end, said exit ends arranged in an array surrounding said front opening;

said gas passages extending rearward from said front end for operative connection to a source of inert gas that will flow forward through said gas passages in sufficient quantity to effectively cool said nozzle;

said front unit including a fluid jacket connectible to a supply which provides fluid that is circulated through said fluid jacket to cool said apparatus;

said front unit also including a body disposed behind said nozzle and including an outer cup and an inner cup extending into said outer cup;

said inner cup having an annular outer wall and said outer cup having an annular inner wall confronting said outer wall in spaced relationship with respect thereto whereby said inner and outer walls cooperate to define said water jacket;

each of said gas passages having a rear entrance end that communicates with an annular manifold for said inert gas; and said rear unit including another annular manifold for inert gas, disposed rearward of said annular manifold, and a plurality of tubes disposed between said inner and outer walls and interconnecting said manifolds.

17. Laser powered metal cladding apparatus as set forth in claim 16 in Which there are a greater number of said gas passages than of said tubes.

18. Laser powered metal cladding apparatus as set forth in claim 17 in which each of said tubes is of a cross-sectional area exceeding that for each of said gas passages.

19. Laser powered metal cladding apparatus as set forth in claim 16 in which said tubes are in lengthwise contact with said outer wall and are spaced from said inner wall.

20. Laser powered metal cladding apparatus including a front unit and a rear unit extending into said front unit through its open rear;

said rear unit having a beam passage extending from front to rear thereof, and said front unit having a front opening aligned with said beam passage whereby a laser beam projected forward through said beam passage is directed to exit said apparatus through said front opening and impinge upon a metal workpiece to heat and thereby liquify a localized surface portion thereof and to form a shallow puddle of liquified metal;

said apparatus also including an annular passage connectible to a supply of metallic cladding powder, said annular passage being operatively positioned and shaped to direct metallic powder moving forward therethrough to exit through said front opening and enter said shallow puddle;

said front unit including a nozzle at its forward end, said nozzle including a front end and a conical sidewall that tapers outward and rearward from said front end, and said front opening being at said front end;

a plurality of narrow generally axially extending gas passages in said conical sidewall, each of said gas passages having an exit end at said front end, said exit ends arranged in an array surrounding said front opening;

said gas passages extending rearward from said front end for operative connection to a source of inert gas that will flow forward through said gas passages in sufficient quantity to effectively cool said nozzle;

said front unit including a fluid jacket connectible to a supply which provides fluid that is circulated through said fluid jacket to cool said apparatus; and at least one gas conduit that extends through said fluid jacket and connects said gas passages to said source of inert gas.

21. Laser powered metal cladding apparatus as set forth in claim 20 in which said nozzle is a removable and replaceable unit.

22. Laser powered metal cladding apparatus as set forth in claim 21 in which thread means removably secures said nozzle to other portions of said front unit.

23. Laser powered metal cladding apparatus as set forth in claim 26 in which said nozzle is constructed mainly of copper.

24. Laser powered metal cladding apparatus as set forth in claim 21 in which said conical sidewall includes an exterior conical surface having a plurality of grooves constituting said gas passages.

25. Laser powered metal cladding apparatus as set forth in claim 24 in which the front unit also includes a retainer that maintains said nozzle in its operative position disposed within said retainer, said retainer including an interior conical surface against which said exterior conical surface abuts.

26. A laser powered metal cladding apparatus as set forth in claim 20 in which the front unit also includes a body disposed behind said nozzle and including an outer cup and an inner cup extending into said outer cup;

said inner cup having an annular outer wall and said outer cup having an annular inner wall confronting said outer wall in spaced relationship whereby said inner and outer walls cooperate to define a thin annular space that constitutes said fluid jacket;

each of said gas passages having a rear entrance end that communicates with an annular manifold for said inert gas;

said rear unit including another annular manifold for inert gas, disposed rearward of said annular manifold, with said jacket interconnecting said manifolds whereby said inert gas also cools said outer cup.

27. Laser powered metal cladding apparatus as set forth in claim 26 in which said fluid jacket is conical.

28. Laser powered metal cladding apparatus as set forth in claim 26 in which said rear unit also includes a tapered front end that extends through a rear opening in said front unit and confronts a tapered interior surface of said front unit, said annular passage being defined by spacing between said tapered front end and said interior surface; and cooperating thread means interconnecting said front and rear units for relative longitudinal movement to selectively adjust said annular passage.

29. Laser powered metal cladding apparatus as set forth in claim 28 also including means for preventing said front and rear units from being rotated relative to one another to thereby maintain said annular passage in its selectively adjusted condition.

* * * * *